(12) United States Patent  
Zhang et al.

(10) Patent No.: US 7,116,972 B1
(45) Date of Patent: Oct. 3, 2006

(54) METHOD AND SYSTEM FOR CONTROL OVER CALL HANDLING

(75) Inventors: Baoquan A. Zhang, Overland Park, KS (US); Von McConnell, St. Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 576 days.

(21) Appl. No.: 09/991,616

(22) Filed: Nov. 16, 2001

(51) Int. Cl.
*H04M 3/42* (2006.01)

(52) U.S. Cl. .............................. 455/414.1; 379/221.09

(58) Field of Classification Search ............. 455/414.1, 455/415, 417, 406, 412.1, 414.4
See application file for complete search history.

(56) References Cited

U.S. PATENT DOCUMENTS

| | | | |
|---|---|---|---|
| 6,154,646 A * | 11/2000 | Tran et al. .................. 455/417 |
| 6,373,930 B1 * | 4/2002 | McConnell et al. ... 379/114.28 |
| 6,408,177 B1 * | 6/2002 | Parikh et al. ............ 455/414.4 |
| 6,498,841 B1 * | 12/2002 | Bull et al. ............. 379/142.08 |
| 6,701,145 B1 * | 3/2004 | Payne et al. ................ 455/417 |
| 6,785,534 B1 * | 8/2004 | Ung ........................... 455/406 |
| 2003/0064711 A1 * | 4/2003 | Gilbert et al. ............. 455/414 |
| 2003/0181202 A1 * | 9/2003 | Link et al. ................. 455/417 |

* cited by examiner

*Primary Examiner*—Gerald Gauthier (57) ABSTRACT

Methods and a system are provided for allowing a subscriber to control the call handling at a customer premises equipment. A calling party can place a call from anywhere in a carrier network to a subscriber at a customer premises equipment. The carrier network prompts the subscriber with call information and a list of call processing choices. The subscriber can select one of the choices and the call is handled properly by the system. The methods and system allow the subscriber to interact with the carrier network in real-time.

16 Claims, 5 Drawing Sheets

METHOD AND SYSTEM FOR CONTROL OVER CALL HANDLING

FIELD OF THE INVENTION

The present invention relates in general to telecommunications and more specifically to providing services over an intelligent network.

BACKGROUND OF THE INVENTION

Some time ago, very few people talked on a wireless phone. It was thought more of a novelty than a necessity. Today that has changed, and having a wireless phone or some other type of wireless communication device is playing an important and ever-increasing role in our society. No longer satisfied with simply placing or terminating a telephone call, wireless subscribers demand special services and often come to expect them when purchasing a wireless telephone or wireless service.

Recent advances in telecommunications have enabled a number of these special services to be made available. Examples of special services may include abbreviated dialing, which allows a subscriber to reach a party by dialing less than the entire telephone number of that party, call forwarding, in which calls directed to the subscriber may be forwarded to another line, terminating call screening, which allows the subscriber to specify certain times during which incoming calls are to be rejected, and originating call screening, in which calls to certain telephone numbers are barred. In general, special services encompass those service features that do more than simply place or terminate telephone call as dialed.

Typically, the special services offered to subscribers are based on databases linked to an intelligent network (IN) through nodes referred to as service control points. Local end offices and other networks can access these databases by sending database query messages through the IN to the service control point. The service control point receives the query message, and may execute an appropriate set of service logic and/or consult appropriate databases to obtain information and instructions needed to provide a special service to the call. After accessing the information, the service control point replies to the query through the IN network to the requesting local end office. Based on the information received, the local end office is then able to create the requested service(s). Therefore, the service control point provides the call handling instructions and service instructions to the local end office so that it knows how to handle calls for a specific subscriber.

SUMMARY

A method and system are provided for real-time control over call handling. A subscriber can control the handling of a call at a customer premises equipment (CPE). Corresponding to the subscriber's control, a service control point provides call-handling and service instructions to appropriately handle the call.

In an exemplary embodiment, a carrier network receives an incoming call from a CPE. Corresponding to the incoming call, one or more call handling choices are forwarded from the carrier network to the CPE. The subscriber responds to the carrier network by selecting one of the choices at the CPE. The response is received at the carrier network and the call is processed according to the received response.

In an exemplary embodiment, a calling party can place a call from anywhere within the carrier network to a subscriber at a customer premises equipment (CPE), or more particularly (by way of example) at a mobile station. At the mobile station, the subscriber is prompted with call information and a list of call handling choices. The carrier network then handles the call pursuant the subscriber's selected choice.

In another exemplary embodiment, a first call processing entity receives an incoming call from a first customer premises equipment (first CPE) to a second customer premises equipment (second CPE), and queries for call handling instructions. A second call processing entity receives the query and pushes information corresponding to the first CPE to a web server. Corresponding to the pushed information, the web server provides one or more call handling choices at the second CPE. The second CPE responds to the web server. The web server forwards the selected choice to the second call processing entity. The second call processing entity responds to the query by providing call handling instructions corresponding to the selected choice to the first call processing entity. The first call processing entity handles the received call in response to the provided call handling instructions.

In another exemplary embodiment, short message service (SMS) messages are used to provide one or more call handling choices at a CPE. The SMS message contains call information and a list of call handling choices. The call information may identify the calling party, and the list of choices may include accepting (e.g., connecting) the call, forwarding the call to voice mail, or forwarding the call to a third party.

The exemplary embodiments provide a subscriber with call handling control at customer premises equipment such as a mobile station. They allow the subscriber to interact with a carrier network to make call handling decisions. Such control can provide a subscriber with increased flexibility in handling an incoming call.

The foregoing and other objects, features and advantages of the methods and system will be apparent from the following more particular description of preferred embodiments as illustrated in the accompanying drawings.

DETAILED DESCRIPTION OF EXEMPLARY EMBODIMENTS

Figure 1A:
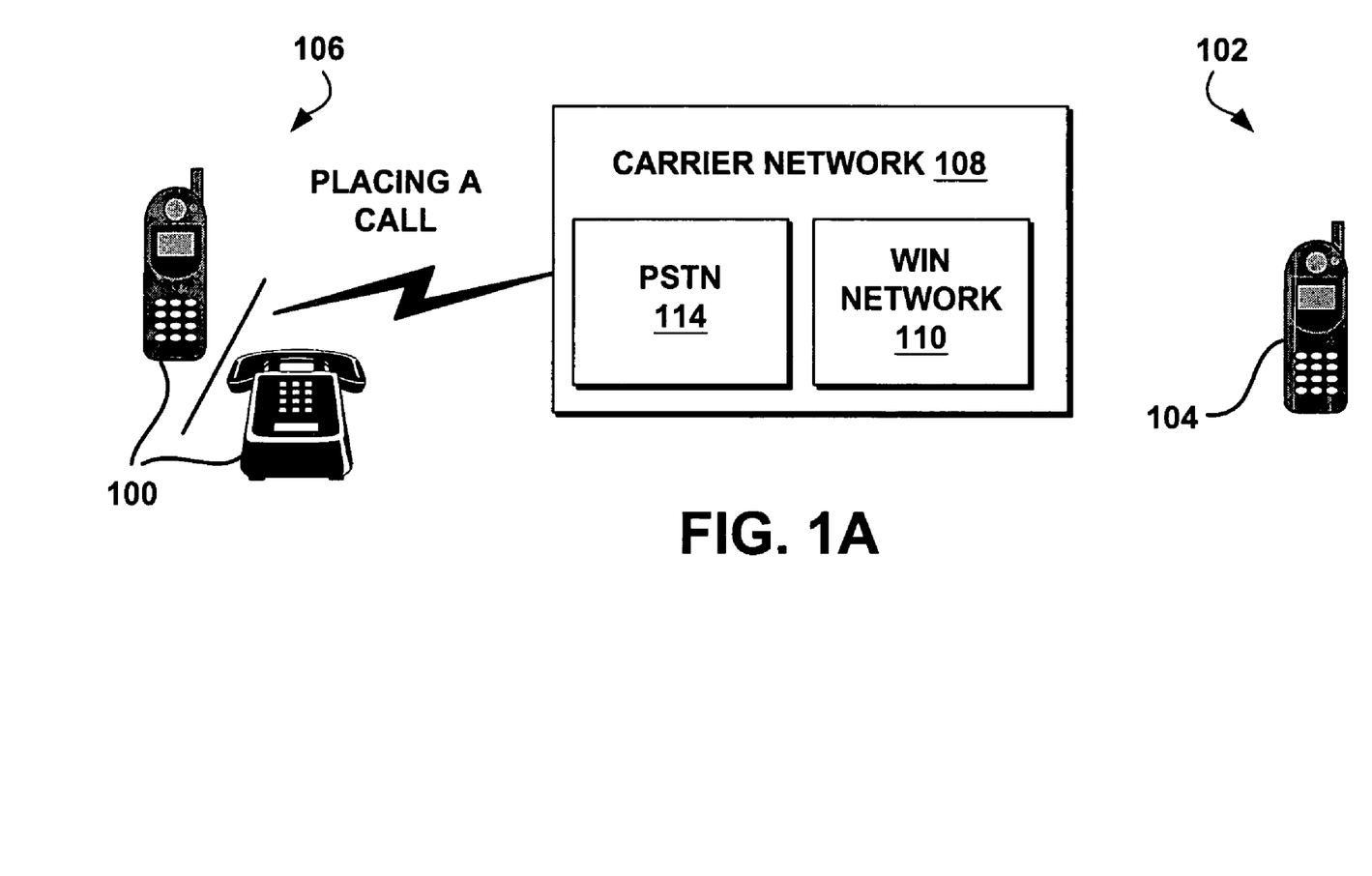
FIGS. 1A, 1B, and 1C are process flow diagrams illustrating in general a process of control over call handling.
Figure 1B:
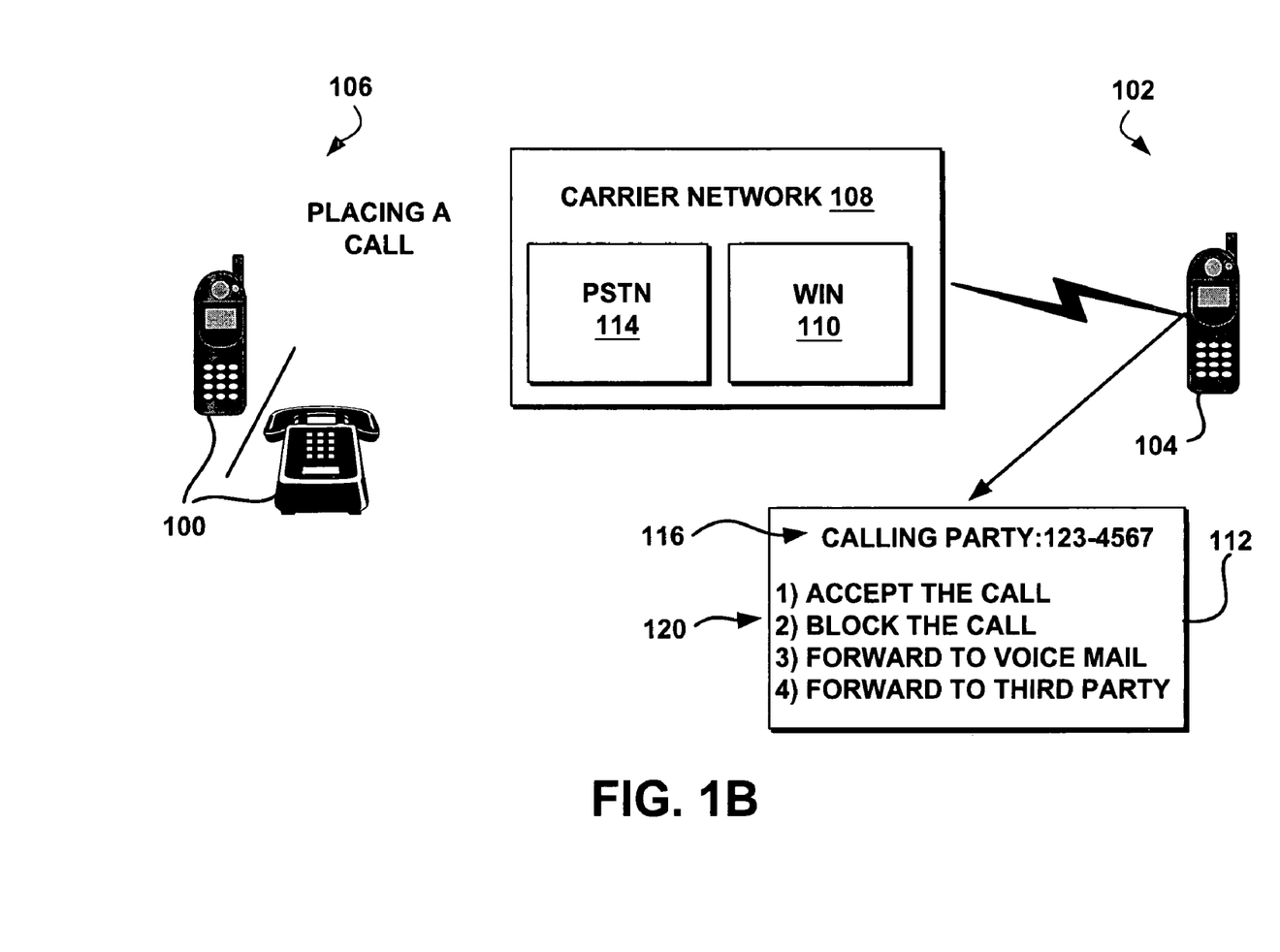
Figure 1C:
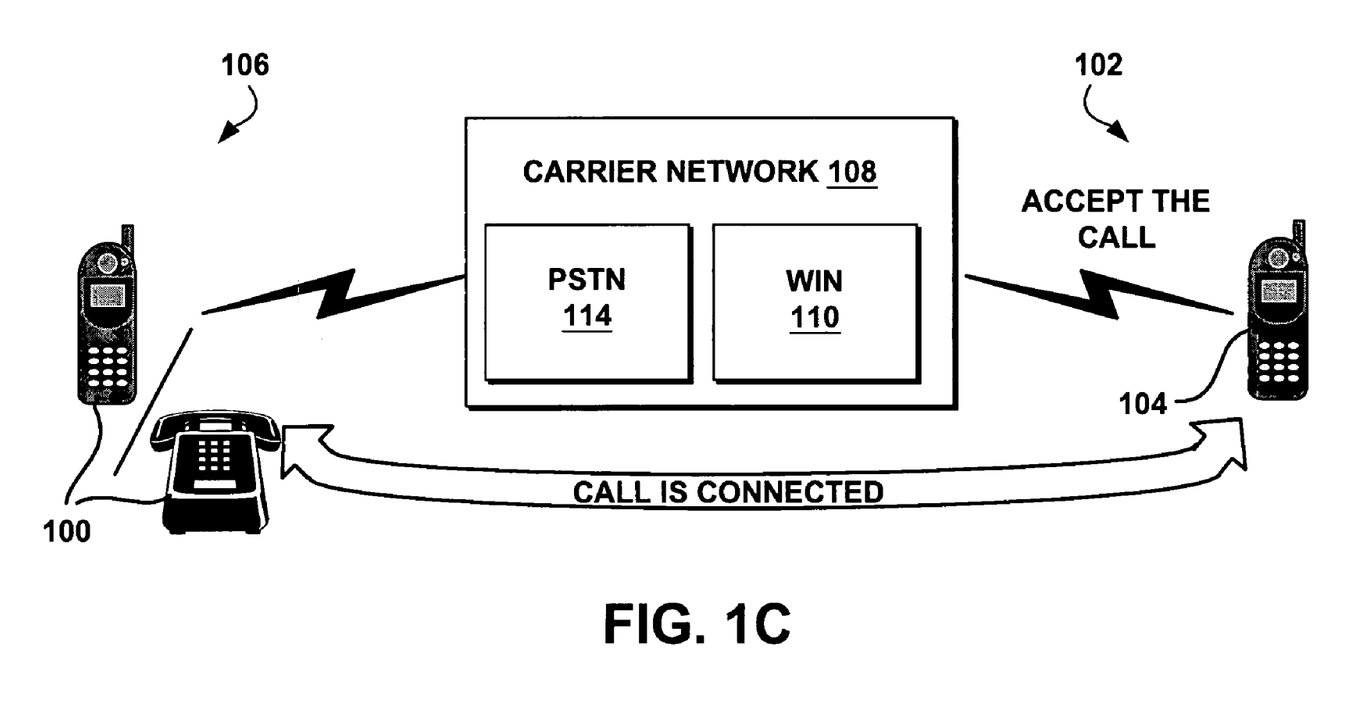

FIGS. 1A, 1B, and 1C are process flow diagrams illustrating a process of real-time control over call handling. Generally, the system includes a carrier network 108 and customer premises equipment (CPE) 102 and 106. In an exemplary embodiment, CPE 102 is shown as a mobile station or wireless telephone 104. Mobile stations might include wireless telephones, personal digital assistants with wireless connectivity, pagers, and so on. Furthermore, CPE 106 can be a mobile station or a landline telephone, so it is shown as either a wireless telephone or a landline telephone 100. Note also that telephone 104 may also be a landline telephone, depending on the application.

The carrier network 108 may generally include the well-known public switched network (PSTN) 114 and a variation of an intelligent network (IN) referred to as a wireless intelligent network (WIN) 110. The WIN network 110 may employ a standardized set of messages for communication with a service control point to allow for a variety of services. This standardized set of messages may be conveyed, for example, over an out-of-band common channel interoffice signaling network according to established signaling protocol. The most well known protocol is Signaling System #7 (SS7). The messages could be Interim Standard IS-41 messages or IS-771 messages.

FIG. 1A illustrates the telephone 100 placing a call to the telephone 104 over the carrier network 108. A subscriber can control the handling of the placed call at the telephone 104. Corresponding to the subscriber's selected control, the WIN network 110 appropriately handles the call.

Referring to FIG. 1B, when a call is placed from the telephone 100 to the telephone 104 over the carrier network 108, the carrier network 108 indicates to the telephone 104 that there is an incoming call. Moreover, the carrier network 108 may prompt the subscriber with call information and a list of call handling choices, described below. Call information may include the calling party's name, the calling party's number, and/or any other type of useful information that might describe the calling party to the subscriber. The list of call handling choices may include one or more choices such as accepting the placed call from the calling party, forwarding the placed call to a voice mail box, forwarding the placed call to a third party, and/or blocking the placed call.

In the exemplary embodiment, call information and the call handling choices may be transmitted to the telephone 104 in one or more short message service (SMS) messages. SMS is one type of mechanism for delivery of short messages, which according to this example includes call information and the call handling choices, from the WIN network 110 to the telephone 104.

In particular, when the telephone 100 places a call to telephone 104, a SMS message that includes call information and call handling choices may be sent from a short message service center (SMSC) located within the carrier network 108 to telephone 104, described in more detail below. SMS mechanisms may make use of a browser on telephone 104 that uses the service of the SS7 transaction capabilities application part (TCAP). A commonly owned patent application Ser. No. 09/459,206, filed on Dec. 10, 1999 and entitled "Automatic In-Line Messaging System" the contents of which are incorporated herein by reference, describes a system that can generate and broadcast messages using a variety of technologies including SMS technology.

In an alternate embodiment, call information and the call handling choices may be transmitted to the telephone 104 using 3G (third generation) wireless technologies and Next Generation Networks (NGN). For example, one 3G technology includes Multi Media SMS (MMS) messages which can transmit messages containing text, graphics, photographic images, audio and even video clips to the telephone 104. Thus, when the telephone 100 places a call to telephone 104, a MMS message that includes call information and call handling choices may be sent from a server to a client application (not shown) hosted on the telephone 104 over a TCP/IP connection. Other types of 3G technologies may be used to deliver the call information and call handling choices to the telephone 104.

FIG. 1B also illustrates a screen-shot 112 that displays exemplary call information 116 and an exemplary list of call handling choices 120. Call information may include the calling party's name and/or telephone number, and may be used by the subscriber to identify the calling party. According to this example, call information 116 illustrates the calling party's number, or in this example, 123-4567. If call information is not available and/or out of the area, then the telephone 104 may inform the subscriber that the call is unidentified through screen shot 112 or through an audible mechanism. In addition to call information 116, the subscriber may also be provided with a list of call handling choices 120 to determine how to handle the call. The subscriber may choose from the list of call handling choices 120 to handle or process the call. For example, the subscriber may accept the call, forward the call to a voice mail system, forward the call to a third party, or block the call, by selecting one of the given options.

The subscriber may select any one of the choices from the list of call handling choices 120, such as by pressing a corresponding key, button, or phrase on the telephone 104 keypad (or on the display if touch-screen technology is implemented). Upon selection, the subscriber's choice is preferably transmitted to the carrier network 108 for processing the choice and performing the appropriate call handling. In this scenario, the subscriber selected the call handling choice of "Accept the Call". Thus, the subscriber wishes to take the call on telephone 104 placed by the calling party on telephone 100.

In another embodiment, the call information and/or list of call handling choices are expressed vocally to the subscriber. According to this embodiment, telephone 104 may employ a voice coder to synthesize speech. For example, by converting digital signals into artificial speech, telephone 104 can provide the subscriber with a list of choices without the use of a display. Furthermore, the subscriber can select one of the choices by spoken commands instead of a keypad. This technology may reduce or eliminate the need for a display and/or keypad.

FIG. 1C illustrates a call connection between the two telephones 100 and 104. Upon selecting the call handling choice, "Accept The Call" in FIG. 1B, the subscriber controlled the call handling in real-time by providing the WIN network 110 with a desired choice on how the subscriber wished to handle the call. Thus, the subscriber may provide the WIN network 110 with the desired choice by selecting one of the given choices from the list of call handling choices 120.

Preferably, the calling party is not aware of the call handling control performed by the subscriber at telephone 104. Thus, the control handling occurs in real-time, or equivalently, any amount of time needed to process the incoming call, provide a list of call handling choices to the subscriber, receive the subscriber's response, and process the call according to the received response. In general, real time may be less than five seconds, however it could be more or fewer seconds depending on the application.

Nonetheless, the call handling control should be transparent to the calling party at the telephone 100. For example, the calling party at the telephone 100 may hear ringing while the WIN network 110 pushes the call information and the list of call handling choices to the subscriber at the telephone 104 and while the WIN network 110 receives a response back from the subscriber at the telephone 104. The WIN network 110 should have a timer set such that if there is no response from the telephone 104, then a default action may further handle or process the call. The default action may be previously selected by the subscriber, if desired and so programmed. In an exemplary embodiment, the choice may be stored in a database at the WIN network 110, or in an alternate embodiment may be known and/or stored in memory at the telephone 104.

Figure 2:
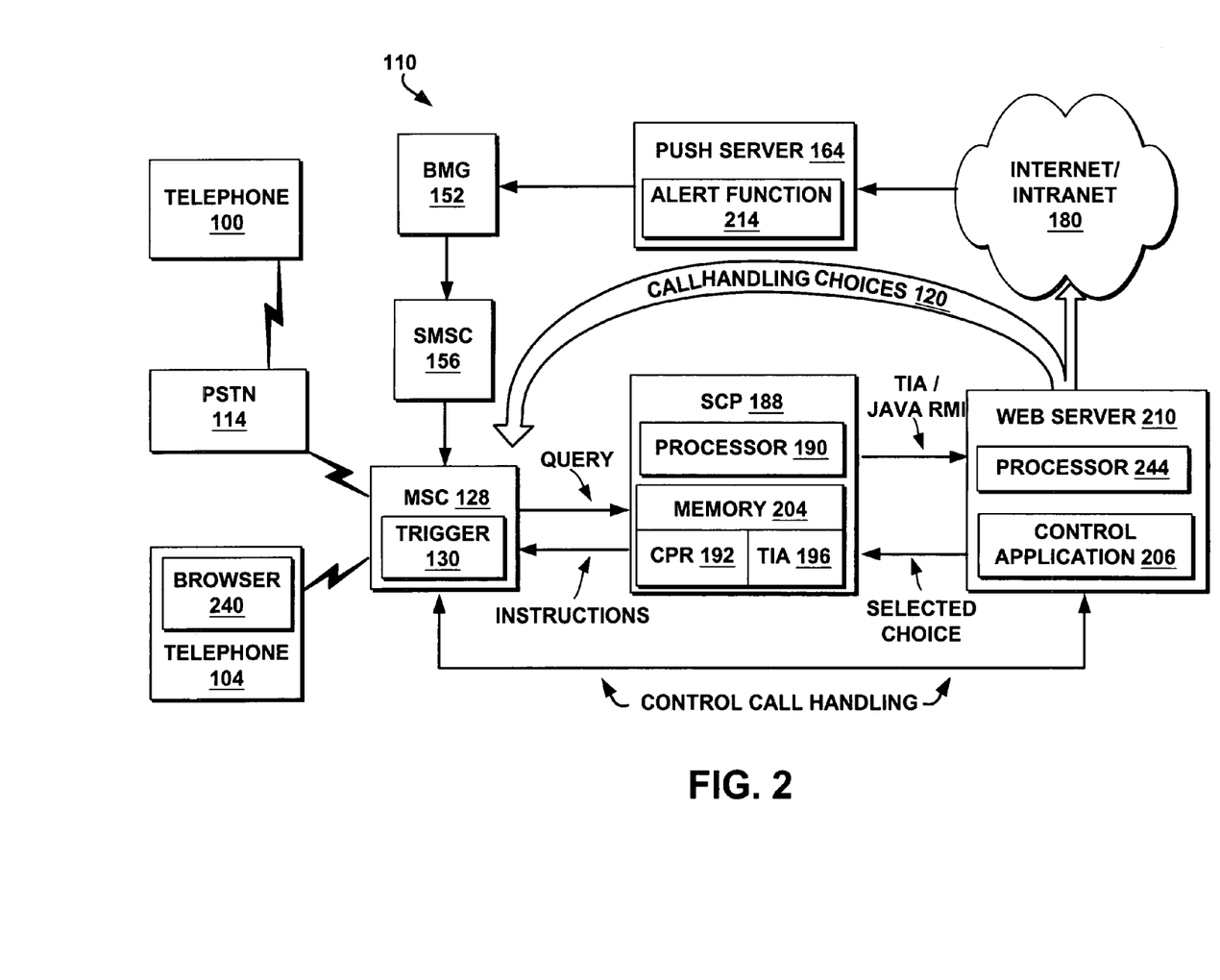
FIG. 2 is a diagram of an exemplary system architecture that may be used to implement the call handling embodiment of FIGS. 1A–1C.

FIG. 2 shows a diagram illustrating an exemplary system architecture of an IN network, and more specifically, the WIN network 110 utilized in FIGS. 1A–1C. The subscriber may provide the WIN network 110 with a selected call handling choice, in which case the WIN network 110 handles the call accordingly. Generally, the system includes a subscriber's wireless telephone 104, mobile switching center (MSC) 128, service control point (SCP) 188, web server 196, push server 164, bulk message gateway (BMG) 152, and short message service center (SMSC) 156. Also included is the telephone 100 that can be either a landline phone or mobile phone, which in this example, places a call to telephone 104 over the PSTN network 114.

Preferably, the MSC 128 performs the switching of placed calls. For example, in FIGS. 1A–1C, the MSC 128 may perform the switching between the call placed by telephone 100 to telephone 104. The MSC 128 has an assigned IS-771 trigger 130 that is hit upon by the incoming call from telephone 100 over the PSTN network 114. The trigger 130 indicates to the MSC 128 that a call has been placed by the telephone 100 to the telephone 104. An exemplary trigger includes an advanced termination trigger. Note that the call from telephone 100 does not have to originate within the PSTN network 114, but may originate within the WIN network 110 at the MSC 128.

In the exemplary embodiment, the advanced termination trigger is hit from an incoming call to telephone 104. If the advanced termination trigger is hit, the MSC 128 may suspend call processing and send an IS-771 query to a configurable destination SCP 188, described more below. The IS-771 query may include the calling party's number, called party's number, digits dialed, switch type/vendor from whom the message was sent, the (ESN) and mobile identification number (MIN) of the telephone 104 being dialed, and so on.

Accordingly, the MSC 128 forwards an IS-771 query to a SCP 188 in response to the trigger 130. An SCP 188 is a service control point that controls service delivery to subscribers by providing call handling instructions to the MSC 128. An exemplary service control point that may provide intranet access is an Integrated SCP or ISCP, which is manufactured by Telcordia Technologies.

Preferably, the SCP 188 includes a memory storage unit 204 for storing a call processing record (CPR) 192 and a trusted invoke application (TIA) 196. The CPR 192 is a record that is invoked by the IS-771 query received from the MSC 128. The CPR 192 records the call processing details and parameters received from the query. Moreover, the CPR 192 may provide further instructions on how to process the call such as by providing a routing number for the telephone 104. In this example, the CPR 192 might also include logic to indicate that the subscriber at telephone 104 has subscribed to a service for controlling the call handling. Thus, the subscriber may control how incoming calls are handled and processed. The SCP 188 also includes a processor 190 for executing the TIA 196.

To provide the service for controlling the call handling, the processor 190 executes the TIA to "push" the information retrieved from the query and/or stored in the CPR 192 to a control application 206 hosted on the web-server 210. The TIA 196 may use various types of communications techniques to communicate with the control application 206 on the web-server 210. In the exemplary embodiment, the TIA 196 uses Java RMI to communicate with the control application 206 on the web-server 210, but in an alternate embodiment, TIA 196 may use Java JMS (Java Messaging Service), CORBA, XML RPC, Java URLConnection and JDBC, etc.

In the exemplary embodiment, the TIA 196 that is hosted on the SCP 188 is invoked by the CPR 192 (also running in the SCP 188) includes a Java plug-in. The CPR 192 is a Telcordia only programming language, which currently does not have an open interface to an external system such as the web server 210. Therefore, the Java plug-in is Java based software that can openly interface with an external system such as the web server 210. Through this interface, the CPR 192 may communicate information with the control application software 206 hosted on the web server 210.

Thus, the TIA 196 may push information retrieved from the IS-771 query and/or stored in the CPR 192 to the control application 206 hosted on web-server 210, and if programmed, the control application 206 can return a response message or code back to the SCP 188. Upon receiving the response message/code, the SCP 188 may parse and make them available in the CPR 192 that was hit when the phone call was made initially by telephone 100. Note that any call related information may be pushed or sent to the web server 210 including the calling party number (i.e., the phone number of the telephone 100) and the called party number (i.e., the phone number of telephone 104).

Upon receiving the pushed information, a processor 244 in the web server 210 executes the control application 206 to provide a list of call handling choices 120 to the subscriber at the telephone 104. This list of call handling choices 120 may include accepting the call, forwarding the call to a voice mail, forwarding the call to a third party, and blocking the call. Accordingly, the call handling choices 120 are forwarded to the telephone 104. In the exemplary embodiment, the web server 210 uses a push server 164, BMG 152, SMSC 156, and MSC 128 to provide a mechanism for communicating the call handling choices 120 to the telephone 104.

To forward the call handling choices 120 to the subscriber at the telephone 104, the web server 210 may invoke an alert function 214 hosted on a push server 164. According to this embodiment, the web server 210 is connected to an Internet/Intranet 180 to communicate with the push server 164. The push server 164 performs an alert function 214 to push the call handling choices 120 to the telephone 104. An exemplary server that performs a user alert function to push data is provided by OpenWave's UP.LINK server. The alert function 214 may then push alerting information to the telephone 104 via the BMG 152 and SMSC 156.

The BMG 152 is an interface between the TCP/IP domain and the remaining carrier network 108. Therefore, BMG 152 serves as a gateway for any messages communicated to telephone 104 from the TCP/IP domain such as from the push server 164 or the Internet 180. In the exemplary embodiment, the alerting information is transmitted through the BMG 152 to the SMSC 156. The SMSC 156 determines the location of the telephone 104 from the parameters in the CPR 192. The SMSC 156 may then deliver the message to the appropriate MSC 128 that is serving the telephone 104.

Call handling choices 120 may be received and stored in the web browser 240 within the telephone 104. Consequently, a choice button is shown to the subscriber. If the subscriber selects to view or accept the call handling choices 120, the telephone 104 or browser 240 running on telephone 104 may then be connected to the control application 206 that initiated the alert function 214. According to this example, the control application 206 hosted on the web server 210 initiated the alert function 214 at the push server 164. Note at that point, control call handling communications between the subscriber over the MSC 128 and the control application 206 is interactive.

Therefore, the subscriber may receive the call handling choices and then selectively press a key on the keypad to select one of the choices provided by control application 206. The subscriber's selected choice may be passed back to the control application 206. The control application 206 in turn sends the subscriber's selected choice and related information to the SCP 188. The SCP 188 sends a response to the querying MSC 128, and provides instruction to the MSC 128 to perform the call handling and processing properly. In the above example, the subscriber wishes to accept the call. Therefore, the MSC 128 would connect the telephone 100 to the telephone 104.

Figure 3:
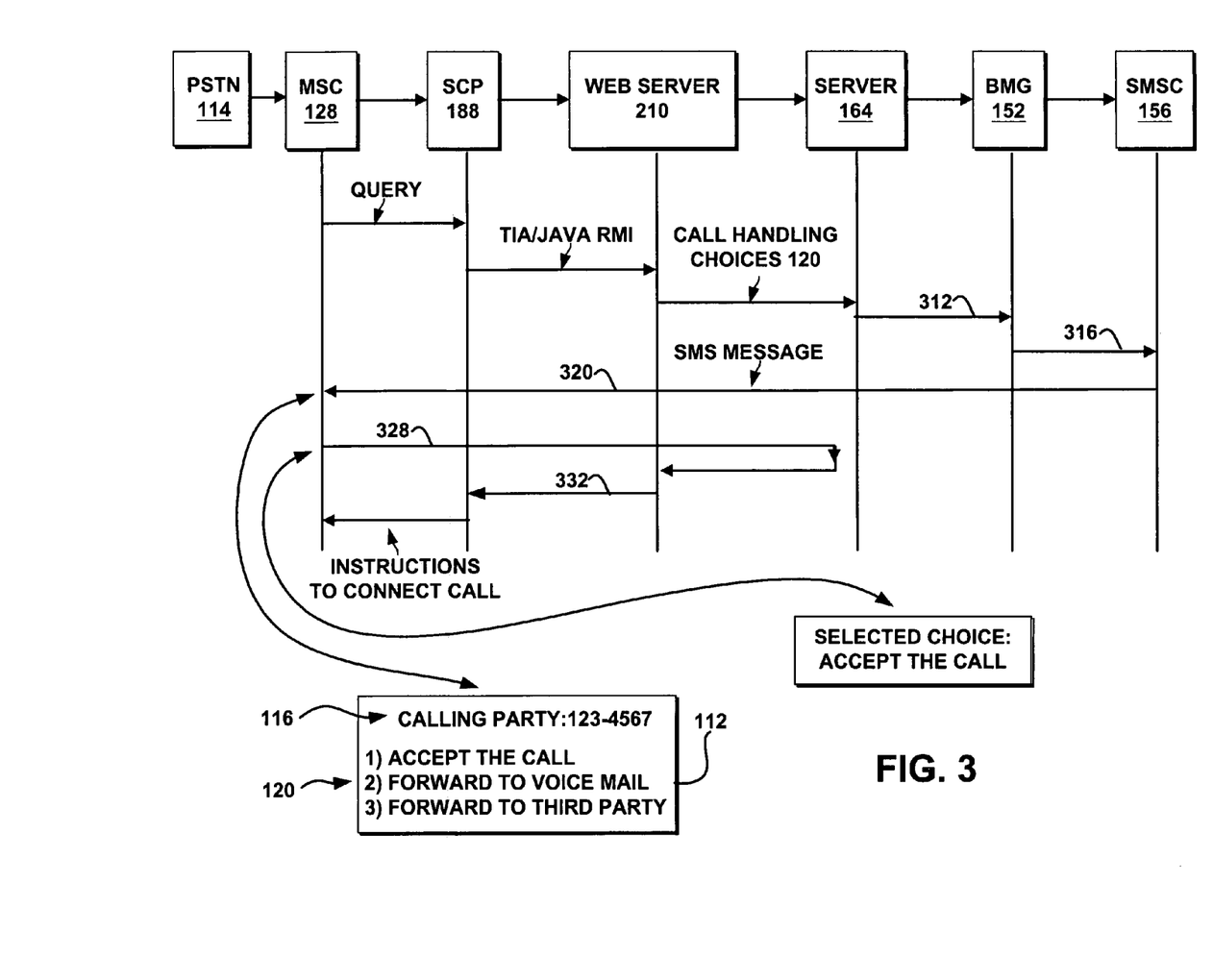
FIG. 3 is a system flow diagram that illustrates in more detail the process flow of the call handling embodiment of FIGS. 1A–1C, and 2.

FIG. 3 is a system flow diagram that illustrates in more detail the process flow of the call handling embodiment of FIGS. 1A–1C, and FIG. 2. In the above example, telephone 100 places a call over the PSTN network 114 to telephone 104. Then, information corresponding to the placed call is generally communicated from the PSTN network 114 to the MSC 128. Telephones 100 and 104 are not shown in FIG. 3 for purposes of clarity.

The MSC 128 may work with a home location register (HLR) and visitor location register (VLR) to provide the call-routing and roaming capabilities of the WIN network 110. The HLR may, in several, contain administrative information of each subscriber registered in the corresponding WIN network 110, along with the current location of the telephone 104. The VLR may contain the physical location of telephone 104 in the form of a signaling address. The HLR and the VLR are not shown for purposes of clarity.

When the information corresponding to the placed call is communicated from the PSTN network 114 to the MSC 128, it triggers the MSC 128 indicating that call processing should be temporarily suspended to perform the call handling service provisioning. Accordingly, the MSC 128 sends a query to the SCP 188 requesting instruction on how to handle the incoming call. Also, the query may contain call information describing the calling party, calling number, and so on, to the SCP 188. In the exemplary embodiment, the communication protocol utilized between MSC 128 and SCP 188 may be given by Interim Standard IS-771 ("Wireless Intelligent Network") and any variations, the contents of which are incorporated herein by reference.

Upon receiving an incoming query from the MSC 128, the SCP 188 invokes a call processing record (CPR). As described above, the CPR provides the SCP 188 with service information that informs the SCP 188 how to process the placed call from telephone 100. According to this example, the CPR may indicate that the subscriber has subscribed to the call handling service. Thus, a TIA is invoked at the SCP 188 to bridge the WIN network 110 into the Internet domain or HTTP packet domain to communicate with web server 210.

The TIA preferably bridges the SS7 signaling protocol with that of an HTTP packet switched network. The TIA pushes the information received from the MSC 128 to a control application on the web server 210. In the exemplary embodiment, the TIA communicates with the web server 210 by Java remote method invocation (Java RMI) in the same SCP 188.

Java RMI enables remote Java objects to be invoked from other Java virtual machines, possibly on different hosts. Preferably, the TIA can make a call on a remote object once it obtains a reference to the remote object, either by looking up the remote object in the bootstrap naming service provided by Java RMI or by receiving the reference as an argument or a return value. For example, the TIA can call a remote object in the web server 196, and that server can be a client of other remote objects.

Upon receiving the information from the SCP 188, a control application hosted on the web server 210 initiates an alert push session to the subscriber's telephone 104. The alert push session allows the web server 210 to transfer call handling choices to the telephone 104. To do this, the web server 210 forwards the call handling choices to the server 164. The server 164 uses its "push" channel to push the call handling choices to the telephone 104. Preferably, the SMSC 156 is the delivery mechanism for the server 164 to deliver SMS messages that include the call handling choices.

The server 164 attempts to deliver the call handling choices 120 immediately to the telephone 104. If the telephone 104 is not available, the server 164 may periodically attempt to deliver the choices, if programmed and/or if so desired. The call handling choices may be sent with a notification. The notification may specify the subscriber ID of the telephone 104, a time-to-live (TTL) specifying how long the server 164 should attempt to deliver the call handling choices, and a URL of the control application 206 at the web server 210. The telephone 104 preferably automatically requests any pending notifications from the web server 210. The push server 164 requests the specified URL from the web server 210. The web server 210 returns the data to the server 164. The server 164 relays the data to the telephone 104 preferably via the BMG 152, per 312, and SMSC 156, per 316.

In the exemplary embodiment, the server 164 communicates with the BMG 152 and the SMSC 156 by using short message peer to peer (SMPP) protocol. SMPP protocol is an open, industry standard protocol designed to provide a flexible data communications interface for transfer of short message data. The contents of the SMPP standard are incorporated herein by reference.

Preferably, the SMSC 156 operates as a gateway MSC that can also receive short messages. The SMSC 156 may also operate as a mobile network's point of contact with other networks. On receiving the short message from the short message center, SMSC 156 preferably uses the SS7 network to interrogate the current position of the telephone 104 from the HLR, the home location register (not shown).

To do this, the SMSC 156 may send an SMS request to the home location register (HLR) to find the roaming customer's location information. As described above, the HLR is a database that holds information of the subscription profile of the mobile station and about the routing information for the subscriber, i.e. the area (covered by a particular MSC) where the mobile station is currently situated. Once the HLR receives the SMS request, it responds to the SMSC 156 with the subscriber's status such as inactive or active, and where the subscriber is roaming. If the response is "inactive", then the SMSC 156 might hold onto the message for a period of time. When the subscriber accesses the telephone 104, the HLR sends a SMS notification to the SMSC 156, and the SMSC 156 may attempt delivery. The system pages the telephone 104, and if it responds, the call information 116 and the call handling choices 120 are delivered. The SMSC 156 receives verification that the choices were received by the telephone 104, and then categorizes the message as "sent" and will not attempt to send again. The SMSC 156 is thus able to pass on the call information 116 and call handling choices 120 to the correct MSC 128, per 320.

The MSC 128 receives the call handling choices and forwards them to the telephone 104 indicating an incoming phone call from telephone 100. The call handling choices 120 are delivered to the phone browser and displayed at display 112 preferably running on the telephone 104. Included (e.g., hidden/embedded) with the call handling choices 120 is the URL to the control web application running on web server 210. Therefore, when the subscriber "clicks" on the choice, a browser session is automatically started and the subscriber is connected to the URL and interacts with web server 210, per 328.

The telephone 104 may communicate with the control application on the web server 210 via the URL address, per 328. The subscriber receives the call information 116 and the list of call handling choices 120. Then, the subscriber can select a desired choice that is communicated to the web server 210.

The subscriber's selected choice is then forwarded from the web server 210 to the SCP 188 per 332. The ISCP 188 finds and locates instruction appropriate for the selected choice in the CPR (192 in FIG. 2). The SCP 188 forwards the instructions to the MSC 128, to respond to the query. Based on the instructions forwarded to the MSC 128, the MSC 128 performs the call handling. In this example, the subscriber selected the choice to "accept the call."

The particular message set (e.g., alert message, etc.) that includes the list of call handling choices may vary depending on the type of network. For example, landline IN networks may operate according standards embodied in Bellcore's AIN Release 0.1 and AIN Release 0.2. On the other hand, wireless networks may operate according to other standards, such as the Telecommunication Industry Association (TIA)/Electronics Industry Association (EIA) Interim Standard IS-41 ("Cellular Radio telecommunications Intersystem Operations") and Interim Standard IS-771 ("Wireless Intelligent Network"). The entirety of each of these standards including any revisions is hereby incorporated by reference.

The exemplary embodiments allow the subscriber to control call handling in real-time. Such call handling can include blocking an incoming call, forwarding the incoming call to voice mail, forwarding the incoming call to a third party, and so on. They allow the subscriber to interact with the carrier network to make call processing decisions in real-time.

It should be understood that the programs, processes, methods and systems described herein are not related or limited to any particular type mobile station or network. Various types of general purpose or specialized mobile stations may be used in accordance with the teachings described herein. For example, the designated push server may be removed from the system and replaced by a 3G technology in a TCP/IP environment.

In view of the wide variety of embodiments to which the principles of the present embodiments can be applied, it should be understood that the illustrated embodiments are exemplary only, and should not be taken as limiting the scope of the present invention. For example, more or fewer elements may be used in the figures.

The claims should not be read as limited to the described order or elements unless stated to that effect. All embodiments that come within the scope and spirit of the following claims and equivalents thereto are claimed as the invention.

What is claimed is:

1. A method for providing real-time service provisioning at a customer premises equipment, the method comprising:
   receiving an incoming call to the customer premises equipment at a switch in a carrier network, and responsively sending a query for call handling instructions from the switch to a service control node in the carrier network;
   providing one or more choices corresponding to handling of the incoming call for selection at the customer premises equipment in response to receipt of the query for call handling instructions at the service control node;
   receiving at the service control node an indication of a choice selected at the customer premises equipment, and providing a response to the query from the service control node to the switch, wherein the response to the query includes call handling instructions corresponding to the selected choice; and
   processing the incoming call at the switch according to the response received from the service control node.

2. The method of claim 1 further comprising:
   providing call information at the customer premises equipment.

3. The method of claim 1 further comprising:
   selecting one of the one or more choices at the customer premises equipment, wherein the selection of one of the one or more choices generates a response message from the customer premises equipment, the response message including the indication of the selected choice.

4. The method of claim 1 wherein processing the incoming call corresponds to connecting the call to the customer premises equipment, forwarding the call to voice mail, or forwarding the call to a third party.

5. The method of claim 1 wherein providing one or more choices at the customer premises equipment is provided by a short message service (SMS) message.

6. The method of claim 1 wherein the customer premises equipment is a mobile telephone, a personal digital assistant (PDA), a pager, or other hand-held wireless device.

7. A method for providing real-time service provisioning, the method comprising:
   receiving at a mobile switching center an incoming call from a first mobile station to a second mobile station, and responsively sending a query for call handling instructions from the mobile switching center to a service control node;
   providing one or more choices corresponding to handling of the incoming call for selection at the second mobile station in response to receipt of the query for call handling instructions at the service control node;
   receiving at the service control node an indication of a choice selected at the second mobile station, and formulating a response to the query according to the selected choice; and
   transmitting the response to the query from the service control node to the mobile switching center, wherein the response includes instructions for handling the incoming call at the mobile switching center, the instructions corresponding to the selected choice.

8. The method of claim 7 wherein providing one or more choices at the second mobile station comprises:
   pushing a short message service (SMS) message to the second mobile station, the SMS message including the one or more choices.

9. The method of claim 7 wherein providing one or more choices at the second mobile station comprises:

a web-server providing one or more choices at the second mobile station.

10. The method of claim 7 wherein receiving at the service control node an indication of a choice selected at the second mobile station comprises:
a web-server receiving the choice selected at the second mobile station and sending the selected choice to the service control node.

11. The method of claim 7 wherein the service control node is a service control point (SCP).

12. A system for providing service provisioning in real time, the system comprising:
a mobile switching center for receiving an incoming call from a first mobile station to a second mobile station, and for sending a query for call processing instructions in response to the received call;
a service control node for receiving the query for call processing instructions from the mobile switching center and for pushing information corresponding to the received call into the Internet domain in response to receipt of the query;
a web-server for receiving the information in the Internet domain from the service control node and (i) for providing one or more choices corresponding to processing of the incoming call for selection at the second mobile station, (ii) for receiving from the second mobile station an indication of a choice selected from the one or more choices, and (iii) for providing the indication of the selected choice to the service control node; and
wherein the service control node responds to the query by providing the mobile switching center with processing instructions corresponding to the selected choice, and wherein the mobile switching center processes the received call according to the processing instructions.

13. The system of claim 12 wherein the service control node is a service control point (SCP).

14. The system of claim 12 wherein the service control node communicates with the web-server over an HTTP packet network.

15. The system of claim 12 further comprising:
a second server; and
a call processing entity in communication with the second server;
wherein the second server pushes an alert message containing the one or more choices via the call processing entity to the mobile switching center, and wherein the mobile switching center forwards the alert message to the second mobile station.

16. The system of claim 15 wherein the call processing entity is a short message service center (SMSC).

* * * * *